United States Patent [19]

Vaughan

[11] 4,355,535
[45] Oct. 26, 1982

[54] APPARATUS FOR AUTOMATICALLY MEASURING THE PROPERTIES OF AIR-PERMEABLE ROD-LIKE ARTICLES

[75] Inventor: Roger Vaughan, Pill, England

[73] Assignee: Imperial Group Limited, Bedminster, England

[21] Appl. No.: 197,285

[22] Filed: Oct. 15, 1980

[30] Foreign Application Priority Data

Oct. 19, 1979 [GB] United Kingdom ............... 7936345

[51] Int. Cl.³ .............................................. G01M 3/26
[52] U.S. Cl. ........................................ 73/37.8; 73/38
[58] Field of Search ................ 73/37, 37.5, 37.8, 38, 73/41, 45, 45.1, 45.2

[56] References Cited

U.S. PATENT DOCUMENTS 4,018,081 4/1977 Loxham .................................. 73/41
4,181,007 1/1980 Arisaka et al. .................... 73/38 X Primary Examiner—Edward R. Kazenske
Assistant Examiner—Joseph W. Roskos
Attorney, Agent, or Firm—Larson and Taylor

[57] ABSTRACT

An apparatus for sequentially measuring the physical properties of air-permeable rod-like articles such as cigarettes or filter rods. The apparatus is self contained and includes stations for measuring the circumference, weight and pressure drop of each article. The measurement of circumference and pressure drop are carried out pneumatically. An indexing drum is provided to transfer each article to the subsequent measuring station.

10 Claims, 2 Drawing Figures

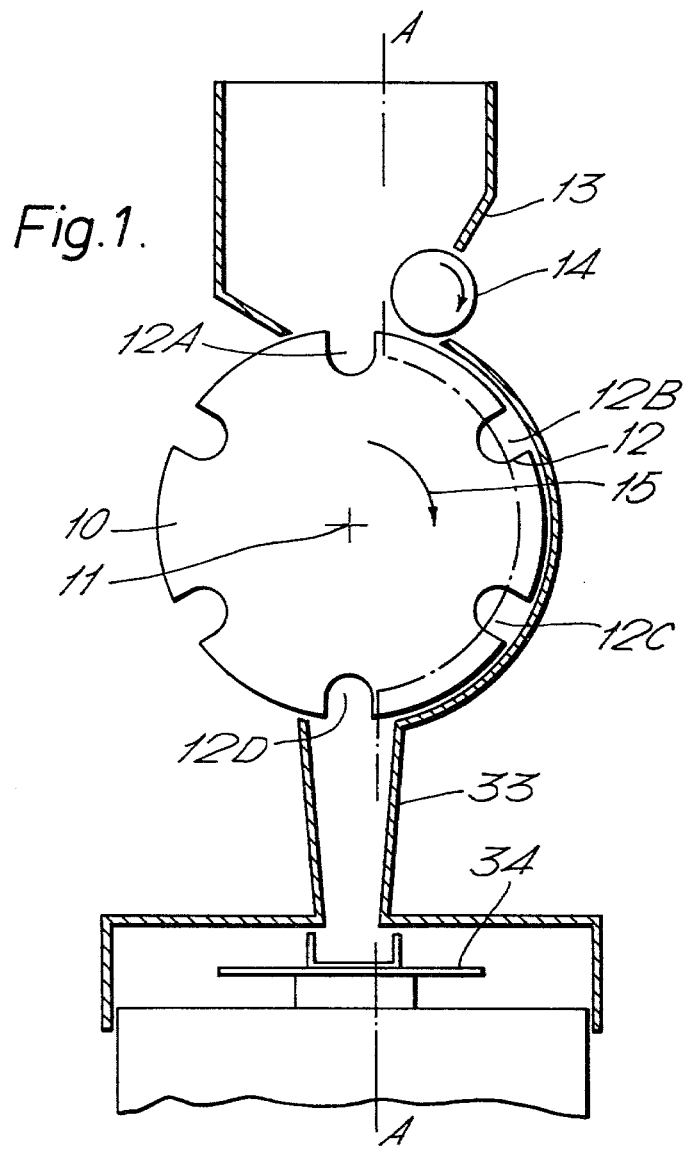

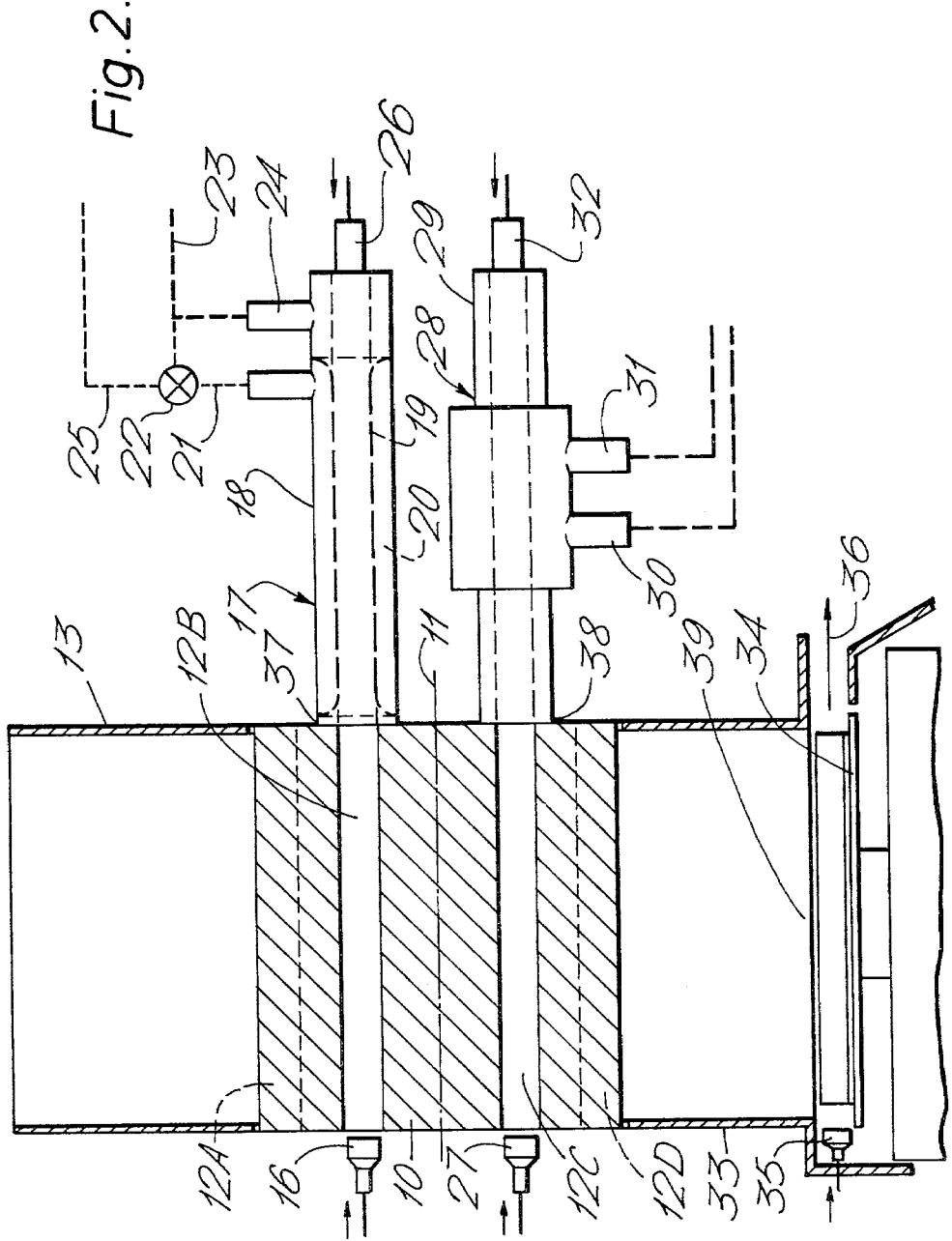

APPARATUS FOR AUTOMATICALLY MEASURING THE PROPERTIES OF AIR-PERMEABLE ROD-LIKE ARTICLES

TECHNICAL FIELD

In the cigarette industry during production of cigarette rods or filter rods, it is necessary to monitor the rods regularly to ensure that they meet manufacturing requirements. As manufacturing speeds are high it is important that the monitoring time is low to avoid undue production wastage if a fault in the rods is discovered.

SUMMARY OF THE INVENTION

It is an object of the invention to provide an apparatus to measure rapidly and comprehensively the physical properties of air-permeable rod-like articles.

An apparatus for automatically measuring the physical properties of air-permeable rod-like articles according to one embodiment of the invention comprises:

a plurality of measuring stations;

an indexing drum arranged to receive an article and to rotate to present the article sequentially to each of the measuring stations;

pneumatic means to transfer the article from the indexing drum to each of the measuring stations and back to the drum;

means for generating signals from the measuring stations which represent the physical properties measured; and means for measuring and recording the signals.

One embodiment of the invention will now be described by way of example with reference to the accompanying diagrammatic drawings in which:

FIG. 1 is an end view of the measuring apparatus; and

FIG. 2 is a section on line A—A of FIG. 1.

DETAILED DESCRIPTION OF THE PREFERRED EMBODIMENT

The apparatus comprises an indexing drum 10 arranged to rotate about its longitudinal axis 11. The drum is intermittently driven by a crank mechanism (not shown). Longitudinally extending slots 12 are spaced at intervals of 60° in the circumference of the drum. Filter rods are loaded into the apparatus through hopper 13 and a roller 14 is provided to assist the entry of a rod into slot 12A.

When a rod has been located in the slot at position 12A beneath the hopper the drum is rotated through 60° in the direction of arrow 15. This rotation brings the rod to position 12B. An air jet from nozzle 16 blows the rod out of the slot into the body of a first measuring station 17 which measures the pressure drop longitudinally of the rod. The air jet is of sufficient duration to ensure that the rod stops within the measuring station. The measuring station 17 comprises a tubular body 18 having a flexible tubular sleeve 19 on its inner surface. An interior region 20 between sleeve 19 and the body 18 is connected via pipe 21 to valve 22.

When the rod has been received in measuring station 17, a pneumatically actuated valve 22 is turned to connect pipe 21 with a pipe 23. Pipe 23 is connected to an air source at 0.5 bar from which air flows through an air controller to pipe 21 to inflate sleeve 19 and thus secure the rod in the body 18. Air from line 23 also passes to an inlet 24 of the measuring station 17 whereupon electronic measuring devices (not shown) determine the pressure differential between the two ends of the rod at a steady air flow regulated by the air controller to 1.05 liter min$^{-1}$. The pressure differential is measured after a predetermined dwell time. This dwell time may be varied independently of the measuring times at the other measuring stations. As the measuring air pressure is applied equally to inlet 24 and to the flexible sleeve 19 the possibility of measuring air leaking past the rod is greatly reduced. The rod is thus gripped evenly by the inflated sleeve 19 throughout its length.

After the pressure differential has been measured, valve 22 is turned to connect pipe 21 with pipe 25 which leads to a source of negative pressure. Air from the inner sleeve 19 is thus withdrawn to release the rod. The air supply to inlet 24 is cut off and an air jet is then supplied through an end nozzle 26 to blow the rod back into slot 12 still in positions 12B. The drum 10 then rotates to bring the rod to position 12C. A jet of air from nozzle 27 blows the rod into a second measuring station 28 which measures the circumference of the rod. When the rod is located in tube 29 of the measuring station 28, air from a pneumatic bridge circuit (not shown) passes through inlet 30, round the rod and leaves through outlet 31. The pressure change caused by the presence of the rod in the tube 29 is measured electronically and the circumference of the rod is determined and recorded. The pressure of the measuring air flow lies within the range 0-2 cm water which minimises the possibility of errors in measurement which might arise with higher pressures due to air leakage through the porous structure of the rod. With such lower pressures the tendency for air to pass through the rod rather than round it is minimised.

The characteristics of the electronic measuring circuits are adjustable to give optimum results for a selected pressure within the range.

After measurement has been completed and recorded the air supply to inlet 30 is shut off and an air jet from end nozzle 32 blows the rod back into slot 12 still in position 12C. The drum 10 then rotates to bring the rod to position 12D. It will be noted that while the times to measure the various parameters are different the drum will not rotate until all measurements have been completed for each rod.

When the rod reaches position 12D it falls under its own weight through guide 33 onto the pan of electronic weighing balance 34. The weight of the rod is then determined and recorded and an air jet from end nozzle 35 ejects the measured rod in the direction of arrow 36 to a storage container (not shown). The zero on the balance is automatically reset before each subsequent reading is taken. Provision is made to take the average weight reading over a given time period while the rod is on the balance 34 to minimise the effect of any knocks or vibrations received by the apparatus during measuring.

On completion of the measuring cycle for a rod the results of the three measurements are displayed on a visual display such as a line printer.

Optical detectors are provided at positions 37 and 38 and are linked to the drum rotation mechanism to prevent its rotation if a rod is stuck mid-way between the drum and a measuring station.

Further optical detectors are provided at positions 39 and 28 and are similarly linked to the rotation mechanism to ensure that the measuring cycle is not begun with a rod resting on the balance 34. These detectors are also linked to a visual display which indicates the location of any fault. Detector 39 is further linked to a counting circuit to monitor the number of rods measured.

The cycle of measurement is continuous; a new rod is inserted in the slot at position 12A at each partial rotation of the drum.

As a rotary drum is used to convey the rods between the measuring stations, the entire apparatus is extremely compact and readily portable. Human error is eliminated as the measurements are carried out electronically. As the circumferential measurement is made pneumatically there is no deformation of the rod which might lead to errors in measurement. Such deformation previously arose when using mechanical measurement such as the tape-wrap method where a fine tape is wrapped at a given tension around the rod thus to determine its circumference.

The apparatus is suitable for measuring the physical properties of either cigarette rods or filter rods. In the case of measuring filter rods it is envisaged that the apparatus may further include or be connected to a station for determining the plasticizer level of the filter.

The apparatus is preferably self-contained, however it may be adapted for inclusion in a rod production line. In this case sample rods may be automatically fed from the production line to the apparatus.

The apparatus may further include microprocessor circuitry and may thus determine the number of rods produced from a given weight of production material, an estimate of wastage and so the production efficiency of the production line.

The apparatus may further generate a quality control chart to provide a visual record of machine performance.

The results of the measurements may be stored on recording means such as magnetic tape for subsequent processing.

The rods may be conveyed to or from the measuring stations by pneumatically actuated pistons in place of the air jets or pulses.

I claim:

1. An apparatus for automatically measuring a plurality of physical properties of air-permeable rod-like articles comprising:
   (a) a plurality of measuring stations,
   (b) an indexing drum arranged to receive an article and to rotate to present the article sequentially at each of the measuring stations,
   (c) means for transferring the article from the drum to the measuring station at which it is presented,
   (d) means at said measuring station to measure a respective physical property of the article,
   (e) means for generating a signal indicative of the magnitude of the physical property measured at the measuring station,
   (f) means for transferring the article from the measuring station back to the drum in readiness for being presented at the next measuring station, and
   (g) means for measuring and recording said signals.

2. An apparatus as claimed in claim 1 in which the physical properties include at least one of: weight, circumference, and pressure drop across the article.

3. An apparatus as claimed in claim 2 in which the measurement of circumference is performed pneumatically.

4. An apparatus as claimed in claim 1 in which the article transfer means is an air jet.

5. An apparatus as claimed in claim 1 in which the article is a tobacco rod.

6. An apparatus as claimed in claim 1 in which the article is a filter rod for a smoking article.

7. An apparatus as claimed in claim 1 wherein the number of measuring stations correspond to the number of physical properties being measured, each station for measuring one such property.

8. An apparatus as claimed in claim 1 wherein said drum has a horizontal axis; and further including means located above said drum for supplying the articles thereto by gravity feed; and means located below said drum for collecting the articles by gravity feed from said drum; and wherein said two transferring means transfer the article in the axial direction.

9. An apparatus as claimed in claim 8 wherein said collecting means is combined with a further measuring station; said apparatus further including further means for transferring the article from said further measuring station away from said drum.

10. An apparatus as claimed in claim 8 and further including slots in said drum for retaining the articles; means located at said supplying means for assisting entry of the articles into said slots; and guide means for radially retaining the articles in said slots while permitting longitudinal movement of the articles along said slots.

* * * * *